United States Patent Office 3,083,515
Patented Apr. 2, 1963

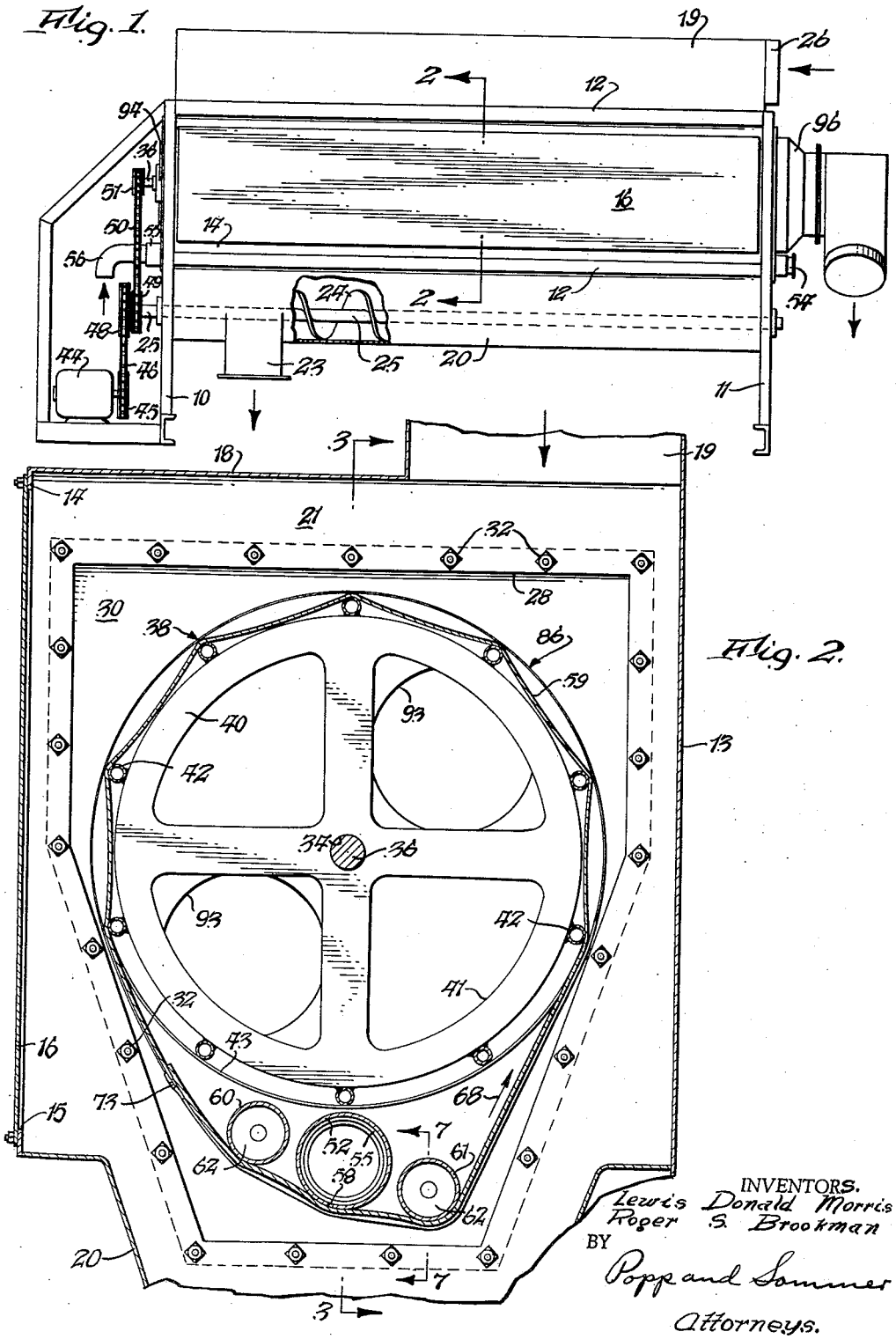

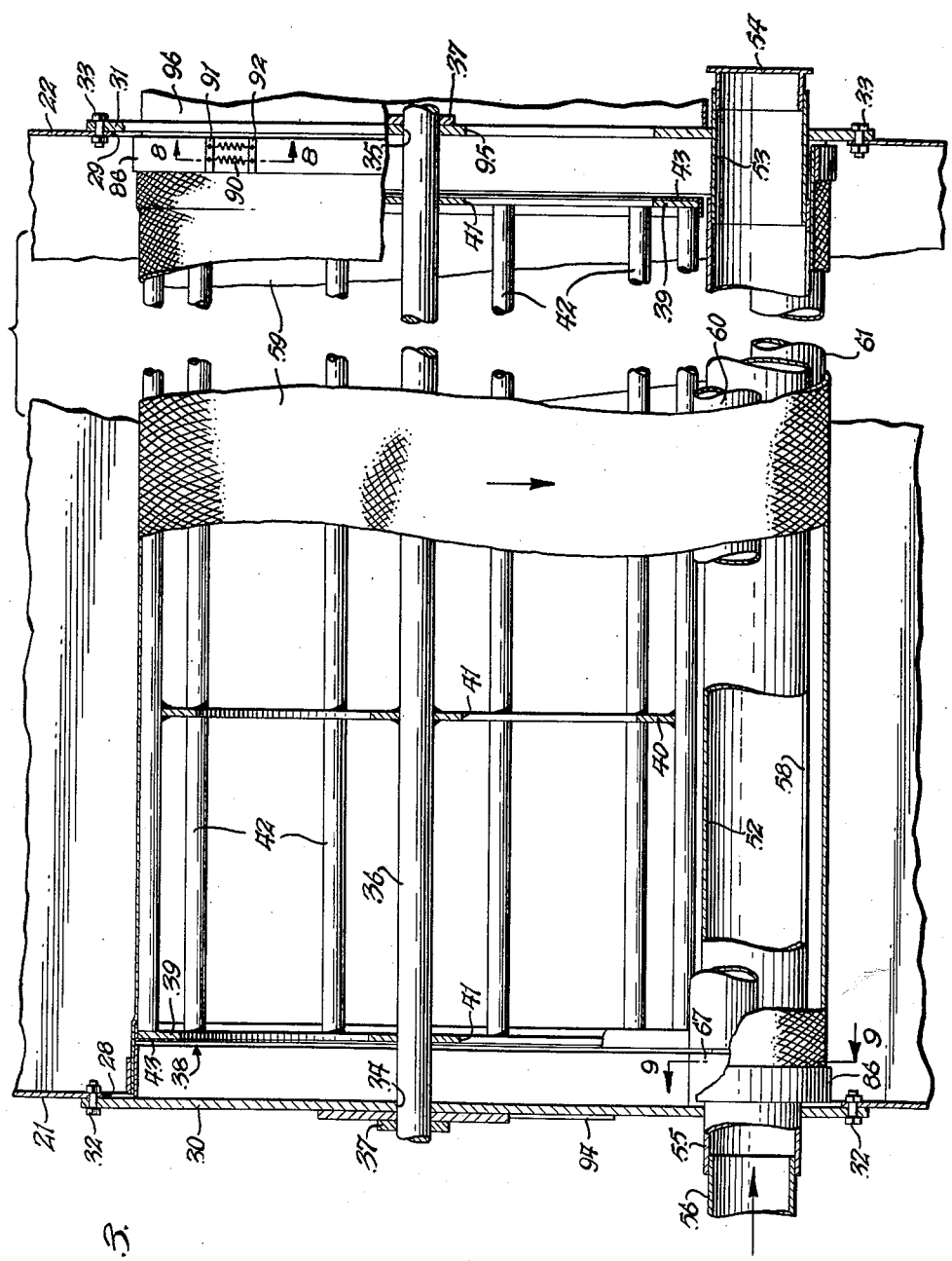

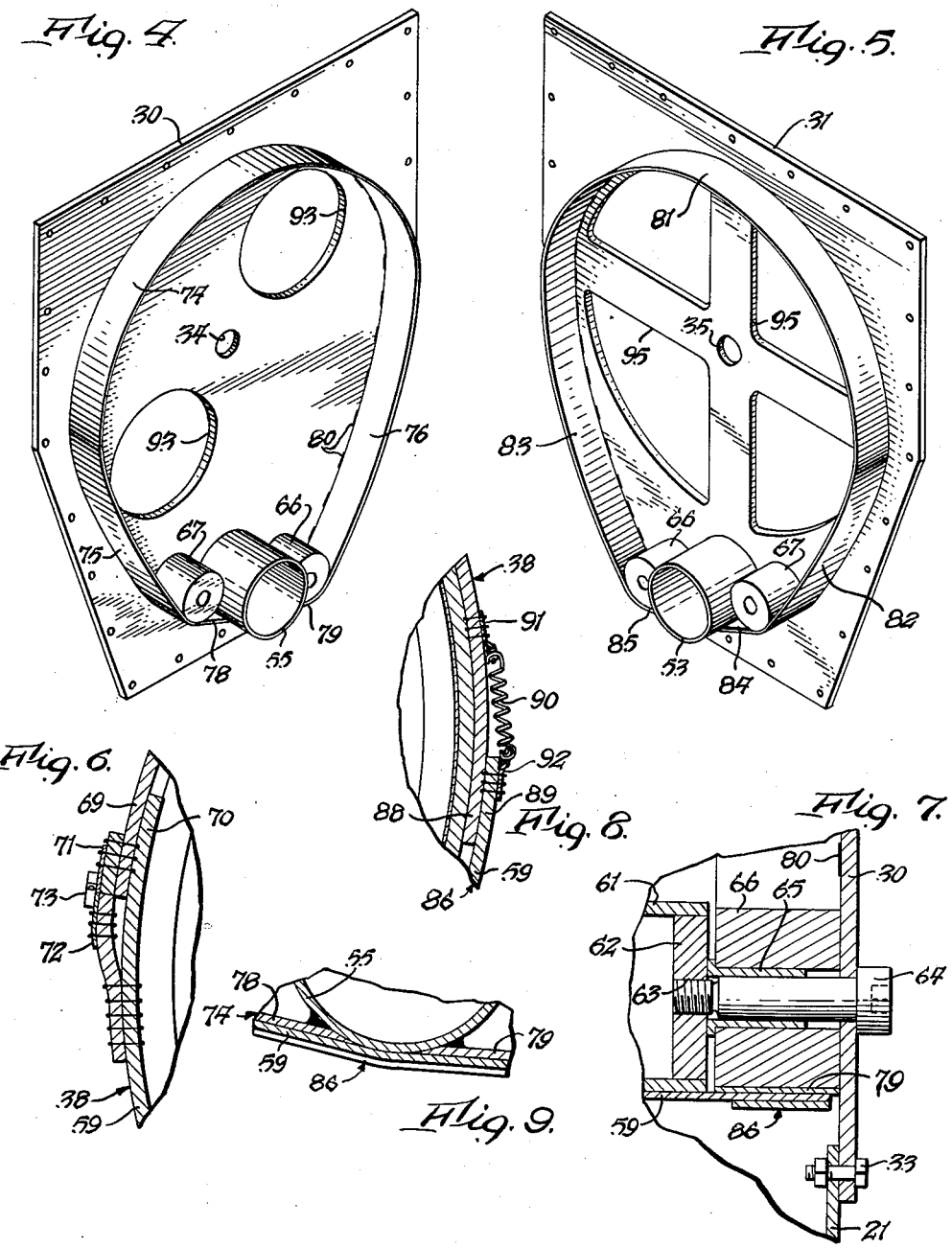

3,083,515
DUST COLLECTOR
Lewis D. Morris, Williamsville, and Roger S. Brookman, East Aurora, N.Y., assignors to Dustex Corp., Buffalo, N.Y., a corporation of New York
Filed Jan. 25, 1960, Ser. No. 4,505
3 Claims. (Cl. 55—290)

This invention relates to improvements in dust collectors, and more particularly to those of the type employing an endless foraminous filter element.

A dust collector of this type is disclosed in United States Patent No. 2,792,907 and comprises an endless foraminous filter element such as cloth arranged as a tube supported at its ends by overlapping and sliding on stationary continuous support surfaces and intermediate its ends passing around a drive support and a stationary support. A difference in pressure exists on opposite sides of the filter element with the higher pressure being on the outside thereof. The stationary support is a blow tube and since there is relative movement between it and the filter element, the dust particles deposited on the outside of the filter element are blown off continuously as the filter element moves over the blow tube. With such an arrangement, it will be seen that there is a substantial area of contact between the blow tube and filter element and the friction between their contacting surfaces develops a considerable drag on the filter element which tends to stretch it. This affects the seal which is desired to be maintained at each of the opposite ends of the tubular filter element where the marginal portion thereof slides over the end support.

It is accordingly one of the chief objects of the present invention to provide an improved construction of dust collector in which strain on the filter element is reduced as it passes over the blow tube whereby stretching of the element is reduced.

Another important object is to provide an improved end seal for the filter element which will remain effective during a long period of use of the dust collector.

Other objects and advantages of the invention will be apparent from the following detailed description and accompanying drawings in which FIG. 1 is a side elevational view of a dust collector embodying the improvements of the present invention.

FIG. 2 is an enlarged fragmentary transverse sectional view thereof and taken on line 2—2 of FIG. 1.

FIG. 3 is a fragmentary longitudinal sectional view thereof and taken on line 3—3 of FIG. 2, certain parts being shown in elevation with portions broken away.

FIG. 4 is a perspective view of one of the brackets for supporting one end of the filter element.

FIG. 5 is a perspective view of the other bracket for supporting the other end of the filter element.

FIG. 6 is a greatly enlarged fragmentary cross-sectional view through a sealed type slide fastener device or zipper which joins the longitudinal edges of the filter element to form the same into a continuous sleeve or tube.

FIG. 7 is a greatly enlarged cross-sectional view of the mounting of one end of a guide roller on one of the end brackets and which roller aids in controlling the extent of contact of the filter element and blow tube in accordance with one improvement feature, this view being taken on line 7—7 of FIG. 2.

FIG. 8 is a fragmentary cross-sectional view, on a scale comparable to that used in FIG. 6, through one end of the cloth as supported on the end bracket and showing also the elastic band which contributes to the provision of the improved sealing arrangement, this view being taken on line 8—8 of FIG. 3.

FIG. 9 is an enlarged fragmentary cross-sectional view through one end of the blow tube and taken on line 9—9 of FIG. 3.

The dust collector is shown as having a frame including vertical end sections 10 and 11 connected by horizontal elongated members 12. A housing or casing is arranged on the frame between the end sections 10 and 11 and this housing includes a rear side wall 13, and a front side wall 14 having a horizontally elongated rectangular access opening 15 extending substantially the full distance between the end frame sections 10 and 11 and closed by a removable cover 16. This housing also includes a top wall 18 suitably formed to provide an inlet duct 19, a trough-shaped hopper section 20 connected to the lower ends of the side walls 13 and 14, and end walls 21 and 22. The hopper section 20 is shown as provided with an outlet 23. Arranged within the trough of the section 20 is a rotatable screw conveyor 24 having a horizontal shaft 25 which upon rotation moves solid materials collected within the hopper section toward the outlet 23. Dirty or particle laden gas is introduced suitably by ducting (not shown) connected to the inlet 26 of the inlet duct 19.

Referring to FIG. 2, the end wall 21 of the collector housing is shown as being cut out to provide an enlarged opening 28. The other end wall 22 is provided with a similar opening, designated 29 in FIG. 3. The openings 28 and 29 are shown as contoured to provide a rectangular upper section and a trapezoidal lower section.

Covering the opening 28 in the end wall 21 is a removable end plate 30, best shown in FIG. 4. A similarly outlined end plate 31 covers the opening 29 in the other end wall 22 and is best shown in FIG. 5. The end plates 30 and 31 have an outline similar to that of the corresponding opening 28 or 29 but are slightly larger so as to overlap the marginal portion of the corresponding end wall bounding the opening therein, as best shown in FIG. 3. The overlapping marginal portions of the corresponding end wall and end plate are provided with registered openings to receive bolt and nut fasteners such as indicated at 32 for the end wall 21 and at 33 for the other end wall 22.

Each of the end walls 30 and 31 is provided with a generally centrally disposed hole designated 34 in the end plate 30 and 35 in the end plate 31. These holes 34 and 35 receive the horizontal shaft 36 of a rotatable drive reel indicated generally at 38. Suitable bearings 37 are mounted on the end plates 30 and 31 to rotatably support the drive shaft 36.

The reel 38 is shown as comprising a pair of end spider wheels 39 and one or more intermediate spider wheels 40. These wheels 39 and 40 are preferably made fast to the shaft 36 by welding so as to rotate therewith, although any other suitable fastening means may be employed. Each of the spider wheels 39 and 40 is provided with a plurality of openings 41, four such openings and each of sector shape being shown provided in each spider wheel. These openings 41 allow for the free and substantially unimpeded movement of gas from one to the opposite side of each spider wheel.

The spider wheels 39 and 40 are shown as being the same in diameter. Fastened to their peripheries in any suitable manner as by welding are a plurality of circumferentially spaced rods 42. These rods 42 are preferably tubes as shown in order to provide a light weight structure and are also shown as arranged at equal circumferential intervals, ten rods being illustrated. The ends of the rods 42 at each end of the reel are enclosed by a circular L-shaped ring 43, the band portion of which embraces the rod ends and the inturned radial flange portion of which overlaps the transverse ends of the rods and the outer end faces of the end wheels 39. Each L-shaped ring 43 is preferably tack-welded to the rods 42 and end wheels 39. In this manner it will be seen that the reel is an open frame structure allowing gas movement radially therethrough and longitudinally thereof.

The shaft 36 of the reel and the shaft 25 of the screw conveyor are driven by suitable means. As shown, an electric motor 44 has a sprocket 45 fast to the outer end of its shaft and through a chain 46 drives a sprocket 48 fast to the outer end of the screw conveyor shaft 25. Arranged adjacent to sprocket 48 and also fast on the shaft 25 is a smaller sprocket 49 connected by a chain 50 to a sprocket 51 fast to the outer end of the reel shaft 36 adjacent the end wall 21. From this arrangement, it will be seen that the motor rotates the shafts 25 and 36 at the desired individual speeds.

Referring to FIGS. 2 and 3, arranged below the drive reel 38 is a stationary horizontal blow tube 52 shown as cylindrical in cross-section. This blow tube extends the full distance between the end walls 21 and 22. One end of this blow tube receives a tubular member or nipple 53 suitably mounted on the end plate 31 and extending through an opening provided therein. The outer end of this nipple 53 is shown as closed by a plug 54. The opposite end of the blow tube 52 receives a second tubular member or nipple 55 which is suitably mounted on and extends through an opening provided in the end plate 30. An inlet pipe 56 is received in the outer end of the nipple 55 and leads to a suitable source of pressurized gas (not shown), such as a blower or fan for compressing air. The blow tube 52 is shown as provided with an elongated slot or aperture 58 which extends along the blow tube the full distance between the opposing ends of the L-shaped rings 43. Instead of a single slot 58, the blow tube 52 may be provided with a series of overlapping individual slots (not shown) which will maintain the structural strength of the blow tube and yet provide full length cleaning.

Embracingly engaging the reel 38 and the blow tube 52 is a flexible endless filter element 59 such as a cloth sleeve or tube. Referring to FIG. 2, it will be noted that the reaches of the filter element 59 between adjacent pairs of those of the rods 42 engaged by the filter element bulge or arch inwardly. The deflection or depth of such bulges or arches is variable depending upon the stretch of the filter element. These bulges or arches are effective to take up slack in the endless filter element.

An important feature of the present invention is to provide means which control the extent to which the filter element 59 wraps around or peripherally contacts the arcuate salient portion of the blow tube 52. For this purpose there is shown a pair of rollers 60 and 61 of substantially equal diameter arranged with their axes fixed on opposite sides of the blow tube 52 and severally spaced therefrom and substantially parallel thereto. Each end of each roller 60 and 61 is provided with an end head 62, as typically shown for the roller 61 in FIG. 7. The end head 62 is press-fitted or otherwise suitably secured within the roller 61 and is centrally provided with an internally threaded hole 63 which receives the externally threaded end of a pivot pin 64. The shank portion of the pivot pin 64 is rotatably received within a sleeve bushing 65, in turn arranged within the central bore of a journal block 66. A journal block 66 is associated with each end of the roller 61 whereas a similar journal block 67 is associated with each end of the other roller 60. The rollers 60 and 61 are thus freely rotatable, being rotated by frictional engagement with the filter element passing thereover and engaging therewith. One such journal block 66 is securely fastened as by welding to each of the end plates 30 and 31 and is in alinement with the other. The same arrangement is provided for the other journal blocks 67.

The reach of filter element between each of the rollers 60, 61 and the blow tube 52 bulges or arches inwardly. It will be seen that by positioning the axes of the rollers 60 and 61 closer to the blow tube 52, the depth or deflection of the bulges or arches, other things being equal, is decreased, whereas it is increased if these rollers are moved farther away from the blow tube.

It will also be noted that the roller 60 is closer to the circular path of the rods 42 of the reel 38 than the other roller 61. The means for rotating the drive wheel 38 are such as to operate to rotate the reel in a counter-clockwise direction as viewed in FIG. 2. Thus the filter element 59 moves from the aforesaid closer roller 60 toward the blow tube 52, or in the direction of the arrow 68 shown in FIG. 2. Inasmuch as the drive reel 38 is pulling on that stretch or reach of cloth of filter element between the roller 61 and the rod of the reel, this reach is in tension and will be substantially straight. On the other hand, the reach of filter element between the last rod of the reel contacted by the filter element and the other roller 60, is slack and will form a bulge or arch. It is preferred to keep this reach short to minimize the span of the bulge or arch.

The filter element 59 is a rectangular piece of cloth or the like which as shown in FIG. 6 has end portions 69 and 70 overlapping each other with the trailing portion 70 being arranged inwardly and the leading end portion 69 being arranged outwardly thereof. In order to connect the overlapping end portion 69 and 70 together a slide fastener assembly or zipper is provided therebetween. This zipper has strips 71 and 72, each provided with the usual teeth adapted to be locked and unlocked by movement of a slide fastener 73 longitudinally of the strips. As shown in FIG. 6, the slide fastener strip 71 is stitched to the outer overlapping end portion 69 and the other slide fastener strip 72 is stitched to the inner end portion 70. The slide fastener assembly is preferably of the type which seals the joint formed by the interlocking teeth. Any other suitable means may be employed for joining the longitudinal edges of the filter element 59.

Another important feature of the present invention is to provide an effective and durable seal for the ends of the endless tubular filter element 59. For this purpose, the end plate 30 on its inner side is shown as provided with an uninterrupted surface formed by the exterior or outer side of an axially extending, looped and continuous flange member 74. The upper portion of the flange member 74 is semi-circular, being concentric to the hole 34 in the end plate 30. One end of this semi-cylindrical section extends downwardly and inwardly as indicated at 75 with a slight convexity to a point of tangency with the higher journal block 67. The other end of the upper semi-circular section of the flange 74 extends downwardly and inwardly with slight convexity as indicated at 76 to a point of tangency with the lower journal block 66. The portion of the flange member between the higher journal block 67 and the nipple 55 is straight and extends tangentially to both the journal block and the nipple, and is indicated at 78. The portion of the flange member which extends between the lower journal block 66 and the nipple 55 is straight and tangent to this journal block and nipple, and is indicated at 79. It will be noted that the nipple 55 on the inside of the end plate 30 has a greater axial length than the journal blocks 66 and 67 which have an axial length corresponding to the width or axial extent of the flange member 74. It will thus be seen that the flange member 74 may be formed of a strap of metal secured at opposite ends to the nipple 55, being welded thereto as indicated in FIG. 9 and being faired into continuity with the lower peripheral portion of the nipple 55. Elsewhere the flange member 74 is secured in position on the end plate 30 by tack welding as indicated at 80.

Referring to the other end plate 31 at the opposite end of the dust collector, this end plate 31 is provided with a continuous uninterrupted flange member 81 which corresponds in contour to the first mentioned flange member 74 only reversed so that when the two flanges oppose each other there is alined coincidence between them. Thus the flange member 81 has an upper semi-cylindrical section concentric to the hole 35 in the end plate 31, a short slightly convex section 82 extending to the upper journal block 67, a long slightly convex section 83 extending downwardly and inwardly toward the lower journal block 66, a straight section 84 extending tangentially between the upper journal block 67 and nipple 63, and another straight section 85 extending tangentially between the lower journal block 66 and the nipple 63.

The flange members 74 and 81 severally project into the corresponding ends of the movable endless tubular filter element 59. The continuous, uninterrupted external surface of each of these flange members 74 and 81 is slidably engaged by the marginal portion of the filter element 59 along its entire length.

In accordance with the present invention an effective seal is provided between each end of the moving filter element 59 and the corresponding flange member 74 or 81, overlapped and engaged thereby. For this purpose, an elastic band 86 embracingly surrounds and frictionally engages the marginal portion at each end of the filter element which overlaps the corresponding stationary flange member.

Each elastic band 86 is shown as comprising an elongated relatively narrow strip of material having overlapping end portions 88 and 89, as shown in FIG. 8. The trailing end portion 88 is arranged on the inside with the leading end portion 89 being arranged on the outside and overlapping the inner end portion 88. Spring means are operatively interposed between the end portions 88 and 89 of the strip and urge the band 86 toward a constricted form. As shown such spring means include a pair of short helical tension springs 90 hooked at one end to an attaching plate 91 and at its other end to a similar attaching plate 92. The plate 91 is suitably fastened to the inner end portion 88, as by stitching. Likewise, the attaching plate 92 is shown as fastened to the outer end portion 89 by stitching.

It is important that the band 86 be made of a material which will produce a substantial frictional engagement with the filter element 59. It is preferred, although not essential, to make the strip or band 86 of the same material, usually cloth, of which the filter element 59 is made. Due to the bending of the filter element 59 and the bands 86 there is relative movement between their opposing and contacting surfaces in a circumferential direction. This frictional and sliding contact produces an ironing action which discourages the filter element 59 from wrinkling under the bands 86.

The end plate 30 is shown as having a pair of diametrically opposed hand holes 93 arranged within the boundary of the continuous flange 74. Each of these holes 93 is covered by a removable cover 94.

The other end plate 31 is shown as provided with a plurality of openings 95, arranged within the boundary of the continuous flange 81. The openings 95 are shown as four in number and each of sector shape. Arranged externally of the end plate 31 and suitably secured thereto and communicating with the openings 95 is an outlet duct 96 for cleaned gas which may be connected to the inlet of an exhaust fan (not shown).

*Operation*

The motor 44 through the sprocket and chain drive rotates the reel 38 in a counter-clockwise direction as viewed in FIG. 2. This moves the filter element 59 in the direction of the arrow 68 and wipingly over the stationary blow tube 52 so as to cover the aperture 58 in this blow tube. The idler rollers 60 and 61 control the extent of peripheral contact between the filter element and the blow tube. The discharge opening 58 in the blow tube is arranged in a plane normal to a line connecting the centers or axes of rotation of idler rollers 60 and 61. Thus the discharge opening 58 is located midway circumferentially about midway of the peripheral extent of contact between the filter element and blow tube. Pressurized gas such as compressed air is supplied to the blow tube and is discharged through the aperture 58 therein to blow off dirt particles deposited upon the outside or high pressure side of the filter element 59. As the filter element is drawn past the stationary blow tube successive portions of the filter element will be cleaned whereby continuous cleaning of the filter element is provided.

The pressure differential across the filter element 59 with the high pressure being on the outside thereof and the low pressure on the inside thereof may be established in any suitable way but, as indicated above, may be provided by a suction fan connected to the outlet 96. This draws particle laden gas into the inlet duct 19, to the interior of the collector housing. The gas passes through the filter element 59, through the openings 41 in the spider wheels 39 and 40, through the sector shaped openings 95 in the end plate 31, and through the outlet duct 96. In passing through the filter element from the outside to the inside thereof, the particles are filtered out and tend to build up on the outside of this filter element. As the filter element continuously moves past the stationary blow tube, the deposited particles are blown off. It will be noted that there is a flexing of the filter element as it passes the salient part of the blow tube. This flexing of the filter element tends to break or fracture the layer of particles deposited on the exterior of the filter element so that when this layer is subjected to the jet of pressurized gas issuing from the blow tube, the removal of the deposited layer will be facilitated.

It will be appreciated that the inward bulges or arches formed in the filter element 59 between those of the adjacent pairs of rods 42 of the reel 38 engaged by the filter element increase the extent to which the filter element wraps around these rods and hence increases the area of contact therebetween to avoid slippage therebetween whereby an effective mechanical drive for moving the filter element is provided. While the rollers 60 and 61 are free to rotate, the blow tube 52 is stationary.

Due to the friction between the opposing and sliding surfaces of the filter element 59 and blow tube 52, force is required to be applied to the filter element to move the same wipingly over the blow tube. The rollers 60 and 61 operate to control the extent to which the filter element tends to wrap around the blow tube. The more the filter element wraps around the blow tube, the greater the area of contact and hence the greater the frictional drag. The rollers 60 and 61 are dimensioned and disposed so that there is a balance of the factor of providing sufficient peripheral contact between the filter element and blow tube to prevent blow-by of the pressurized gas discharged from the blow tube and hence insure passage of the blast of gas through the filter element, against the factor of keeping such peripheral contact as small as possible to minimize the frictional drag which if excessive may result in undue stretching of the filter element and an aggravation of the end seal problem. The peripheral contact should not exceed about 90°. The seal at each end of the filter element as it slides over the corresponding flange 74 or 81 is effectively maintained by the elastic band 86 which prevents wrinkling of the marginal portion of the filter element.

While the pressure differential across the filter element has been illustrated with the higher pressure on the outside and the lower pressure on the inside of the filter element, it will be understood that the apparatus may be adapted for a reversed pressure differential by suitably supporting and sealing the ends of the filter element and arranging the blow tube and wrap control rollers on the outside of the filter element rather than on the inside as shown.

From the foregoing, it will be seen that the invention as illustrated and described achieves the objects stated. Since changes in details of construction will occur to those skilled in the art, the specific embodiment of the invention shown is therefore illustrative rather than limitative, and the invention is to be measured by the scope of the appended claims.

What is claimed is:

1. In a dust collector, the combination comprising a drive reel rotatable about a fixed axis and including a plurality of circumferentially spaced parallel rods, a stationary blow tube arranged exteriorly of the circular path of said rods and parallel to the axis of said reel and having an arcuate salient portion, rollers of substantially equal diameter arranged with their axes fixed on opposite sides of said blow tube and severally spaced therefrom and substantially parallel thereto, one of said rollers being disposed closer to said path than the other, an endless filter element embracingly engaging said reel, arcuate portion and rollers, and means for rotating said reel in a direction to move said filter element from the aforesaid closer roller toward said blow tube and wipingly over said arcuate portion, the reaches of said filter element between adjacent pairs of those of said rods engaged by said filter element forming arches, the reaches of said filter element between each of said rollers and said blow tube forming arches, said rollers being arranged to control the peripheral extent of contact between said arcuate portion and filter element, said blow tube having an aperture located in said arcuate portion and circumferentially about midway of said peripheral extent of contact and adapted to discharge pressurized gas through said filter element as it passes thereover and for cleaning the same.

2. In a dust collector, the combination comprising a movable endless tubular filter element, a support member having a stationary continuous uninterrupted surface projecting into one end of said filter element and slidably engaged by the marginal portion thereof along its entire length, and an elastic band embracingly surrounding and frictionally engaging said marginal portion but said band being otherwise unattached to said marginal portion, whereby the opposing and contacting surfaces of said filter element and band are permitted to move relative to each other in the direction of sliding movement of said filter element on said stationary surface of said support member.

3. In a dust collector, the combination comprising a movable endless tubular filter element, a support member having a stationary continuous uninterrupted surface projecting into one end of said filter element and slidably engaged by the marginal portion thereof along its entire length, and an elastic band embracingly surrounding and frictionally engaging said marginal portion but said band being otherwise unattached to said marginal portion, whereby the opposing and contacting surfaces of said filter element and band are permitted to move relative to each other in the direction of sliding movement of said filter element on said stationary surface of said support member, said band comprising a strip of the same material of which said filter element is made and having overlapping end portions and spring means operatively interposed between the ends of said strip and urging said band toward a constricted form.

References Cited in the file of this patent

UNITED STATES PATENTS

| | | |
|---|---|---|
| 996,860 | Kestner | July 4, 1911 |
| 1,002,618 | Winkler | Sept. 5, 1911 |
| 2,134,544 | Ashley | Oct. 25, 1938 |
| 2,792,907 | Replogle | May 21, 1957 |

FOREIGN PATENTS

| | | |
|---|---|---|
| 13,502 | Great Britain | Oct. 13, 1884 |
| 6,870 | France | Jan. 25, 1957 |
| | (1st add. to 366,807) | |
| 1,017,890 | Germany | Oct. 17, 1957 |